(12) United States Patent
Jang et al.

(10) Patent No.: US 12,199,544 B2
(45) Date of Patent: *Jan. 14, 2025

(54) MOTOR DRIVING APPARATUS AND METHOD

(71) Applicants: Hyundai Motor Company, Seoul (KR); Kia Corporation, Seoul (KR)

(72) Inventors: Han Geun Jang, Seoul (KR); Nae Chun Park, Pyeongtaek-si (KR); In Ho Kim, Seoul (KR); Sang Cheol Shin, Suwon-si (KR); Choul Woo Jung, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 128 days.

This patent is subject to a terminal disclaimer.

(21) Appl. No.: 18/098,885

(22) Filed: Jan. 19, 2023

(65) Prior Publication Data

US 2024/0039435 A1 Feb. 1, 2024

(30) Foreign Application Priority Data

Jul. 26, 2022 (KR) .................. 10-2022-0092536

(51) Int. Cl.
*H02P 27/08* (2006.01)
*H02P 5/74* (2006.01)
(Continued)

(52) U.S. Cl.
CPC ............. *H02P 5/74* (2013.01); *H02P 25/18* (2013.01); *H02P 25/22* (2013.01)

(58) Field of Classification Search
CPC .. H02P 25/22; H02P 27/08; H02P 5/74; H02P 25/18
(Continued)

(56) References Cited

U.S. PATENT DOCUMENTS 10,581,361 B2 3/2020 Chen et al.
11,722,088 B2 * 8/2023 Kim .................. H02P 25/18
318/811

(Continued)

FOREIGN PATENT DOCUMENTS

JP 2004-112970 A 4/2004
JP 2014-155407 A 8/2014
(Continued)

*Primary Examiner* — Gabriel Agared
(74) *Attorney, Agent, or Firm* — Morgan, Lewis & Bockius LLP

(57) ABSTRACT

A motor driving apparatus includes a first motor including first windings respectively corresponding to phases, a second motor including second windings respectively corresponding phases, a first inverter including first switching elements and connected to a first end of each of the first windings, a second inverter including second switching elements, a first changeover switch including third switching elements respectively connected to a second end of each of the first windings at one end and connected to each other at the other end, a second changeover switch including switches selectively connecting the second inverter with the second end of each of the first windings or the second inverter with a first end of each of the second windings, and a controller configured for controlling the states of the first switching elements, the second switching elements, the third switching elements and the switches based on preset conditions.

18 Claims, 5 Drawing Sheets

(51) Int. Cl.
*H02P 25/18* (2006.01)
*H02P 25/22* (2006.01)

(58) Field of Classification Search
USPC .......................................................... 318/724
See application file for complete search history.

(56) References Cited

U.S. PATENT DOCUMENTS

2009/0033253 A1    2/2009  Nagashima et al.
2020/0059189 A1*  2/2020  Ohashi .................... H02P 27/06
2022/0416711 A1* 12/2022  Kim ....................... H02M 7/537

FOREIGN PATENT DOCUMENTS

| | | |
|---|---|---|
| JP | 2015-167448 A | 9/2015 |
| JP | 2015-186317 A | 10/2015 |
| JP | 2016-048997 A | 4/2016 |
| JP | 6285256 B2 | 2/2018 |
| JP | WO2017/187577 A1 | 7/2018 |
| KR | 10-2021-0122343 A | 10/2021 |

* cited by examiner

MOTOR DRIVING APPARATUS AND METHOD

CROSS REFERENCE TO RELATED APPLICATION

The present application claims priority to Korean Patent Application No. 10-2022-0092536, filed Jul. 26, 2022, the entire contents of which is incorporated herein for all purposes by this reference.

BACKGROUND OF THE PRESENT DISCLOSURE

Field of the Present Disclosure

The present disclosure relates to a motor driving apparatus, and more particularly, to a motor driving apparatus configured to efficiently drive a plurality of motors according to driving situations.

Description of Related Art

In general, windings for respective phases included in a motor are connected to an inverter at one end and connected to each other at the other end to form a Y-connection.

When the motor is driven, switching elements in the inverter are turned on or off by a pulse width modulation (PWM) and an alternating current is generated by applying a line voltage to the windings of the Y-connected motor to generate torque.

Because the fuel efficiency (or electrical efficiency) of an eco-friendly vehicle such as a hybrid electric vehicle (HEV), an electric vehicle (EV), and the like that utilizes the torque generated by the motor as power is determined by the power conversion efficiency of the inverter-motor, it is important to maximize the power conversion efficiency of the inverter and the efficiency of the motor to improve the fuel efficiency.

The efficiency of the inverter-motor system is mainly determined by the voltage utilization rate of the inverter. The fuel efficiency may be improved when the operating point of the vehicle as determined by the relationship between the motor speed and the torque is formed in a section with a high voltage utilization rate.

However, because an increase in the number of windings of the motor to increase the maximum torque of the motor moves the section with a high voltage utilization rate away from a low torque region, a problem is that the fuel efficiency may deteriorate. Furthermore, when the main operating point is designed to be in a section with a high voltage utilization rate from the viewpoint of fuel efficiency, a problem is that the acceleration performance of the vehicle may deteriorate caused by the limited maximum torque of the motor.

On the other hand, a four-wheel drive powertrain apparatus may also be implemented by disposing different motors on each of the main and auxiliary drive wheels in an electrified vehicle. However, a separate inverter is commonly provided for each motor to respectively control the two motors. In the instant case, the problem is that an in-vehicle space for mounting the inverters is required and that the vehicle price also increases.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus configured to switch between motor driving modes according to the required output of the motor while reducing losses and improving a voltage utilization rate.

Technical objects to be achieved by the present disclosure are not limited to the technical objects described above, and other technical objects not described will be clearly understood by those skilled in the art to which the present disclosure pertains.

The present disclosure for addressing the technical issues described above provides a motor driving apparatus that includes a first motor including a plurality of windings respectively corresponding a plurality of phases, a second motor including a plurality of windings respectively corresponding to a plurality of phases, a first inverter including a plurality of first switching elements and connected to a first end of each of the first windings, a second inverter including a plurality of second switching elements, a first changeover switch including a plurality of third switching elements respectively connected to a second end of each of the first windings at one end and connected to each other at the other end portion, a second changeover switch including a plurality of switches selectively connecting the second inverter with plurality a second end of each of the first windings or the second inverter with a first end of each the plurality of second windings, and a controller configured for controlling states of the plurality of first switching elements, the plurality of second switching elements, the plurality of third switching elements and the plurality of switches based on preset conditions.

For example, the second changeover switch may have a first state in which the second inverter and the first end of each of the second windings are connected, by controlling the plurality of switches, a second state in which the second inverter and the second end of each of the first windings are connected, by controlling the plurality of switches, and an OFF state in which the second inverter, the first end of each of the second windings, and the second end of each of the first windings are electrically disconnected from each other, by controlling the plurality of switches.

For example, the preset condition includes whether driving the second motor is required, and the controller may turn on the first changeover switch and control the second changeover switch to the first state when the driving the second motor is required.

For example, when driving the second motor is required, the controller may be configured to control the second inverter through pulse width modulation according to whether driving the second motor is required.

For example, the controller may be configured to determine either a closed-end winding mode or an open-end winding mode to be the driving mode of the first motor based on a torque command for the first motor.

For example, the controller may be configured to determine the driving mode based on the reverse magnetic flux of the first motor corresponding to the torque command.

For example, the controller may be configured to determine the driving mode based on a map in which the driving mode is preset for each operating point according to torque and RPM.

For example, when the closed-end winding mode is determined to be the driving mode, the controller may turn off the second inverter, turn on the first changeover switch, turn off the second changeover switch, and control the first inverter through pulse width modulation (PWM).

For example, when the open-end winding mode is determined to be the driving mode, the controller may turn off the first changeover switch, control the second changeover switch to the second state, and control the first inverter and the second inverter by PWM.

For example, the controller may be configured to determine either the closed-end winding mode or the open-end winding mode to be the driving mode when the driving the second motor is not required.

Furthermore, according to an exemplary embodiment of the present disclosure, a method of controlling a motor driving apparatus including a first motor including a plurality of first windings respectively corresponding to a plurality of phases, a second motor including a plurality of second windings respectively corresponding to a plurality of phases, a first inverter including a plurality of first switching elements and connected to a first end of each of the first windings, and a second inverter including a plurality of second switching elements may include determining whether driving the second motor is required, and when driving the second motor is required, turning on a first changeover switch that includes a plurality of third switching elements respectively connected to a second end of each of the first windings at one end and connected to each other at the other end portion, connecting the second inverter with a first end of each of the second windings through a second changeover switch, and controlling the second inverter by PWM.

For example, the method may further include determining the driving mode of the first motor to be the closed-end winding mode or the open-end winding mode based on a torque command for the first motor when the driving the second motor is not required.

For example, the method may further include turning on the first changeover switch, turning off the second changeover switch, turning off the second inverter, and controlling the first inverter by PWM when the driving mode of the first motor is determined to be the closed-end winding mode.

For example, the method may further include turning off the first changeover switch, connecting the second inverter with the second end of each of the first windings through the second changeover switch, and controlling the first inverter and the second inverter by pulse width modulation (PWM) when the driving mode of the first motor to be the open-end winding mode.

For example, the driving requirement of the second motor may include a four-wheel drive requirement.

According to the motor driving apparatus, when a single motor is driven, the motor driving mode may be switched over based on the reverse magnetic flux and required output of the motor so that the efficiency may be increased or the output may be increased selectively according to the driving situation Furthermore, two motors may be driven simultaneously with a single motor driving system so that the space efficiency in the vehicle may be improved compared to a structure including a separate inverter for each motor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
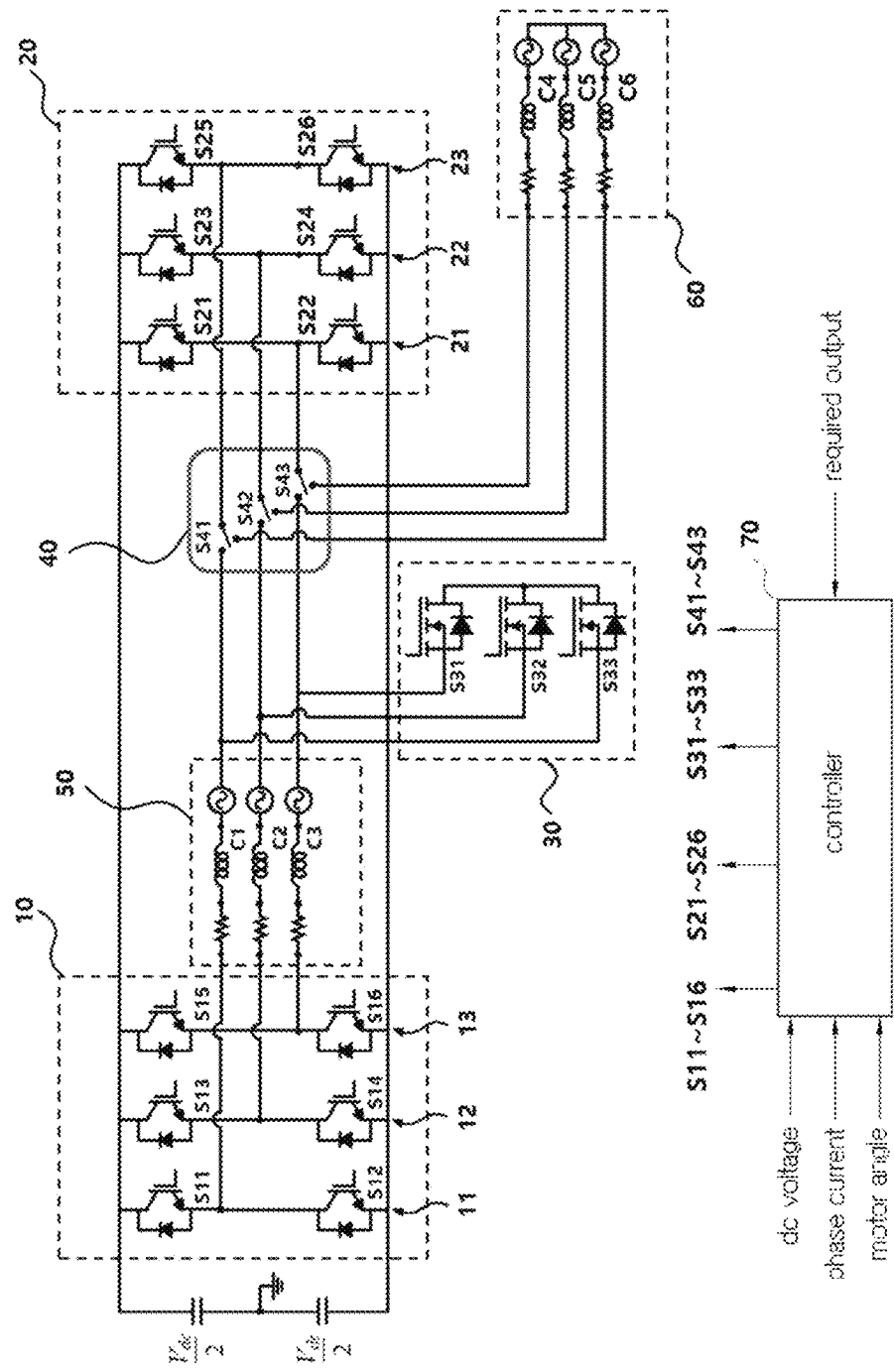
FIG. 1 is a circuit diagram of a motor driving apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Embodiments included herein will be described in detail with reference to the accompanying diagrams in the following, and the same or similar components are provided the same reference numerals regardless of the figure numbers, and repetitive descriptions thereof will be omitted. The suffixes "module" and "portion" for the components used in the following description are provided or used interchangeably only in consideration of the ease of writing up the specification and do not have distinct meanings or roles in themselves. Furthermore, in describing the exemplary embodiment included in the present specification, when it is determined that specific descriptions of related technology already known may obscure the gist of the exemplary embodiments included in the present specification, the detailed descriptions thereof will be omitted. Furthermore, it is to be understood that the accompanying diagrams are only for easier understanding of the exemplary embodiments included in the present specification, that the technical ideas included in the present specification are not limited by the accompanying drawings, and that all modifications, equivalents, or substitutes of the exemplary embodiments are included in the ideas and technical scope of the present disclosure.

Terms such as first and/or second may be used to describe various components, but the components are not to be limited by the terms. The terms only serve the purpose of distinguishing one component from other components.

When a component is referred to as being "connected" or "coupled" to another component, it may be directly connected or coupled to the another component, but it is to be understood that other components may exist in between. On the other hand, when a component is referred to as being "directly connected" or "directly coupled" to another component, it is to be understood that there are no intervening components present.

Singular expressions include plural expressions unless the context explicitly indicates otherwise.

In the present specification, terms such as "comprise" or "have" are intended to designate the presence of implemented features, numbers, steps, operations, components, parts, or combinations thereof described in the specification and are not to be understood to preclude the presence or additional possibilities of one or more of other features, numbers, steps, operations, components, parts, or combinations thereof in advance.

Furthermore, a unit or control unit included in the names such as a motor control unit (MCU), a hybrid control unit (HCU), and the like is a term used in the naming of a controller that is configured to control a specific function of a vehicle only and does not mean a generic function unit. For example, each control unit may include a communication device communicating with other control units or sensors to control the functions it is responsible for, a memory storing an operating system, logic commands, and input/output information, and one or more processors executing judgment, determination, and determination, and the like needed for controlling the functions it is responsible for.

FIG. 1 is a circuit diagram of a motor driving apparatus according to an exemplary embodiment of the present disclosure.

FIG. 1 shows that, according to an exemplary embodiment of the present disclosure, a motor driving apparatus configured to supply driving power to a first motor including a plurality of windings C1-C3 respectively corresponding to a plurality of phases and a second motor 60 including a plurality of windings C4-C6 respectively corresponding to a plurality of phases, includes a plurality of first switching elements S11-S16 includes a first inverter 10 connected to connected to a first end of each winding of a first motor 50, a second inverter 20 including a plurality of second switching elements S21-S26, a first changeover switch 30 including a plurality of third switching elements S31-S33 respectively connected to a second end of each winding of the first motor 50 at one end and connected to each other at the other end, a second changeover switch 40 including a plurality of switches S41, S42, S43 selectively connecting the second inverter with the second end of each winding of the first motor 50 or the second inverter 20 with the first end of each winding of a second motor 60, and a controller 70 controlling ON/OFF state of first switching elements S11-S16, second switching elements S21-S26, and third switching elements S31-S33 and state of switches S41-S43 based on preset conditions.

Here, each winding of the second motor 60 may be connected to the second changeover switch 40 at one each and connected to each other at the other end. Furthermore, when the motor driving apparatus illustrated in FIG. 1 is applied to a vehicle, the first motor 50 is configured as the main driving motor connected to the main drive wheels and the second motor 60 is configured as an auxiliary driving motor connected to the auxiliary drive wheels. However, this is an illustrative example and the configuration is not necessarily limited thereto. For example, the second motor 60 is configured as a hybrid starter generator (HSG) when provided in a hybrid electric vehicle.

The first inverter 10 and the second inverter 20 may invert the DC power stored in a battery into three-phase AC power and supply the three-phase AC power to the motor 60 or may convert regenerative braking energy generated by the generation of regenerative braking torque of the motor 50, 60 at the time of regenerative braking into a direct current and supply the direct current to the battery (however, the second motor 60 is operated by the second inverter 20). The conversion between DC power and AC power may be performed through pulse width modulation of the plurality of first switching elements S11-S16 and the plurality of second switching elements S21-S26 respectively provided in the first inverter 10 and the second inverter 20.

The first inverter 10 may include a plurality of legs 11-13 to which a DC voltage is applied. Each of the legs 11-13 may correspond to each of phases of the first motor 50 to form an electrical connection.

The first leg 11 may include two switch elements S11, S12 connected to each other in series and a connection node of the two switching elements S11, S12 may be connected to one end of a winding C1 of a phase in the first motor 50 so that AC power corresponding to a phase of the plurality of phases is inputted and outputted. Similarly, the second leg 12 may include two switching elements S13, S14 connected to each other in series and the connection node of the two switching elements S13, S14 may be connected to a winding C2 of a phase in the first motor 50 so that AC power corresponding to a phase of the plurality of phases is inputted and outputted. Furthermore, the third leg 13 may include two switching elements S15, S16 connected to each other in series and the connection node of the two switching elements S15, S16 may be connected to one end of a winding C3 of a phase in the first motor 50 so that AC power corresponding to a phase of the plurality of phases is inputted and outputted.

The second inverter 20 may also have a similar configuration as the first inverter 10. The second inverter 20 may include a plurality of legs 21-23 to which a DC voltage is applied. Each of the legs 21-23 may correspond to each of phases of the first motor 50 or the second motor 60 to form an electrical connection according to the state of the second changeover switch 40.

The plurality of third switching elements S31-S33 of the first changeover switch may respectively be connected to the other end of each of the windings C1-C3 included in the first motor 50 at one end and may be connected to each other at the other end.

A variety of switching devices known in the art such as MOSFET, IGBT, thyristor, relay, and the like may be employed in the third switching element S31-S33.

The plurality of switches S41-S43 of the second changeover switch 40 may have three states. The first state is a state in which the first motor 50 and the second inverter 20 are electrically connected, the second state is a state in which the second motor and the second inverter 20 are electrically connected, and an OFF state is a state in which the first motor 50, the second motor 60, and the second inverter 20 are electrically disconnected.

The driving mode of a motor driving apparatus according to an exemplary embodiment will be described with reference to FIG. 2, FIG. 3 and FIG. 4 in the following.

Figure 2:
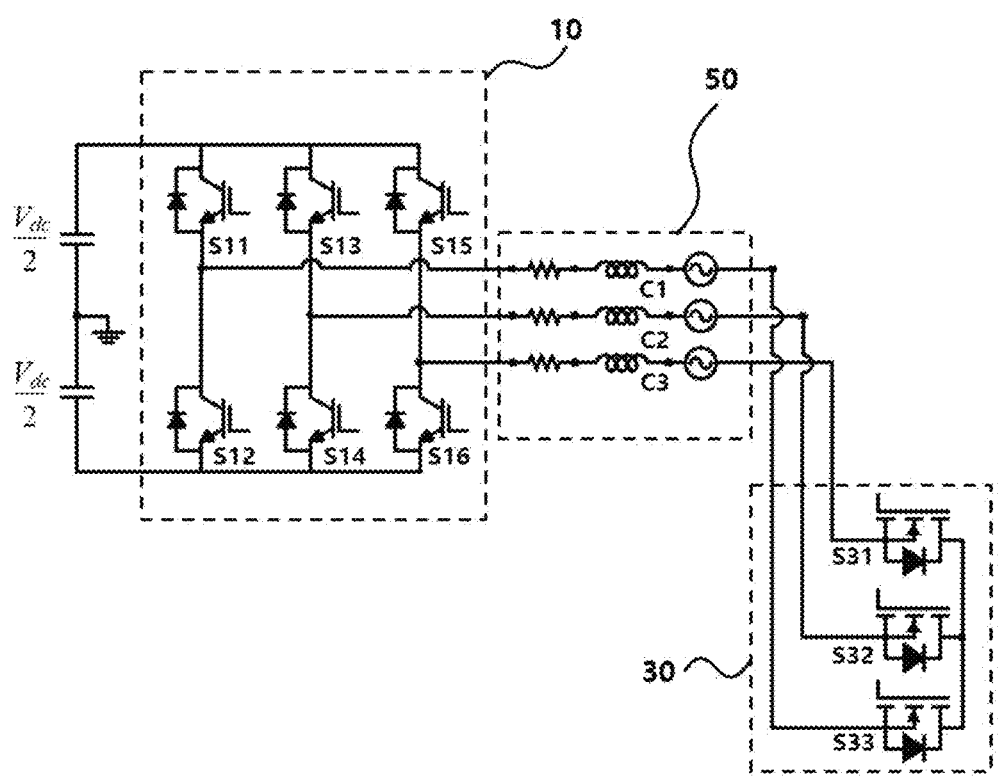
FIG. 2 illustrates an example of a connecting state between components according to a driving mode according to an exemplary embodiment of the present disclosure.

FIG. 2 illustrated an example of a connecting state between components according to a driving mode according to an exemplary embodiment of the present disclosure.

FIG. 2 shows that when the first changeover switch 10 is turned on (that is, the plurality of third switching element sS31-S33 are turned on), the other ends of the windings C1-C3 of the first motor 50 form an electrical connection with each other so that the first motor 50 has a Y-connected winding structure with a neutral point. Accordingly, with the plurality of third switching elements 40 turned on, the second inverter 20 is deactivated (all of the plurality of second switching elements S21-S26 are turned off), the second changeover switch 40 is turned off, and only the first switching elements S11-S16 of the first inverter 10 are switched through the PWM so that the first motor 50 may be driven.

Figure 3:
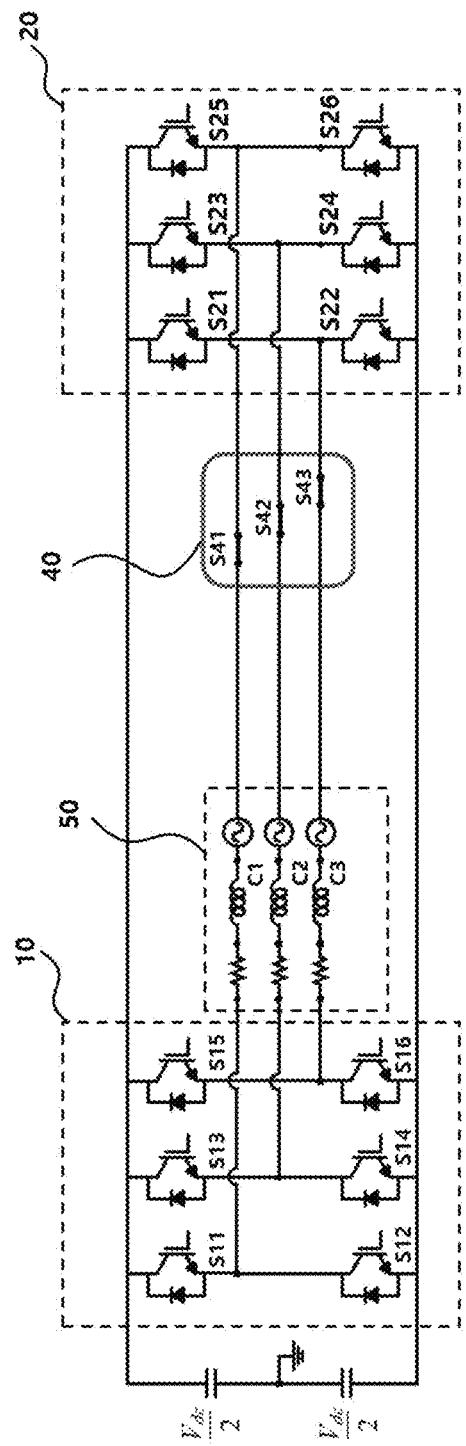
FIG. 3 illustrates an example of a connecting state between components according to another driving mode according to an exemplary embodiment of the present disclosure.

FIG. 3 illustrates an example of a connecting state between components according to another driving mode according to an exemplary embodiment of the present disclosure.

FIG. 3 shows that either end of the windings C1-C3 of the first motor 50 is respectively connected to the first inverter 10 and the second inverter 20 when the first changeover switch 30 is turned off (that is, the plurality of third switching elements S31-S33 are turned off) and the second changeover switch 40 is controlled to the first state. Accordingly, both the first inverter 10 and the second inverter 20 are activated so that all of the first switch elements S11-S16 and the second switching elements S21-S26 are switched through PWM so that the first motor 50 may be driven.

In the art, as illustrated in FIG. 2, the mode in which the first changeover switch 30 is turned on and connected to the other end of the windings C1-C3 of the first motor 50 and the second changeover switch 40 is turned off to activate the first inverter 10 only so that the first motor 50 is driven may be referred to as a closed-end winding mode or Y-connection mode.

A motor may be driven in the closed-end winding mode by the controller 70 controlling the first switching elements S11-S16 of the first inverter 10 by PWM upon receiving an input of a DC voltage of the first inverter 10, a phase current provided to the first motor 50, and a motor angle measured by a motor rotor sensor provided in the first motor 50. Because various techniques for driving a motor by controlling one inverter by PWM are already known in the art, a further detailed description of the PWM technique of the inverter performed in the closed-end winding mode is omitted.

Furthermore, as illustrated in FIG. 3, the mode in which the first changeover switch 30 is turned off and the second changeover switch 40 is controlled to the first state to active both the first inverter 10 and the second inverter 20 respectively connected to either end of the windings C1-C3 of the first motor 50 so that the first motor 50 is driven may be referred to as the open-end winding (OEW) mode.

In the open-end winding mode, the motor may be driven by the controller 70 controlling the first switching elements S11-S16 of the first inverter 10 and the second switching elements S21-S26 of the second inverter 20 through PWM upon receiving an input of a DC voltage of the first inverter 10 and the second inverter 20, a phase current provided to the first motor 50, and a motor angle measured by a motor rotor sensor provided in the first motor 50.

Figure 4:
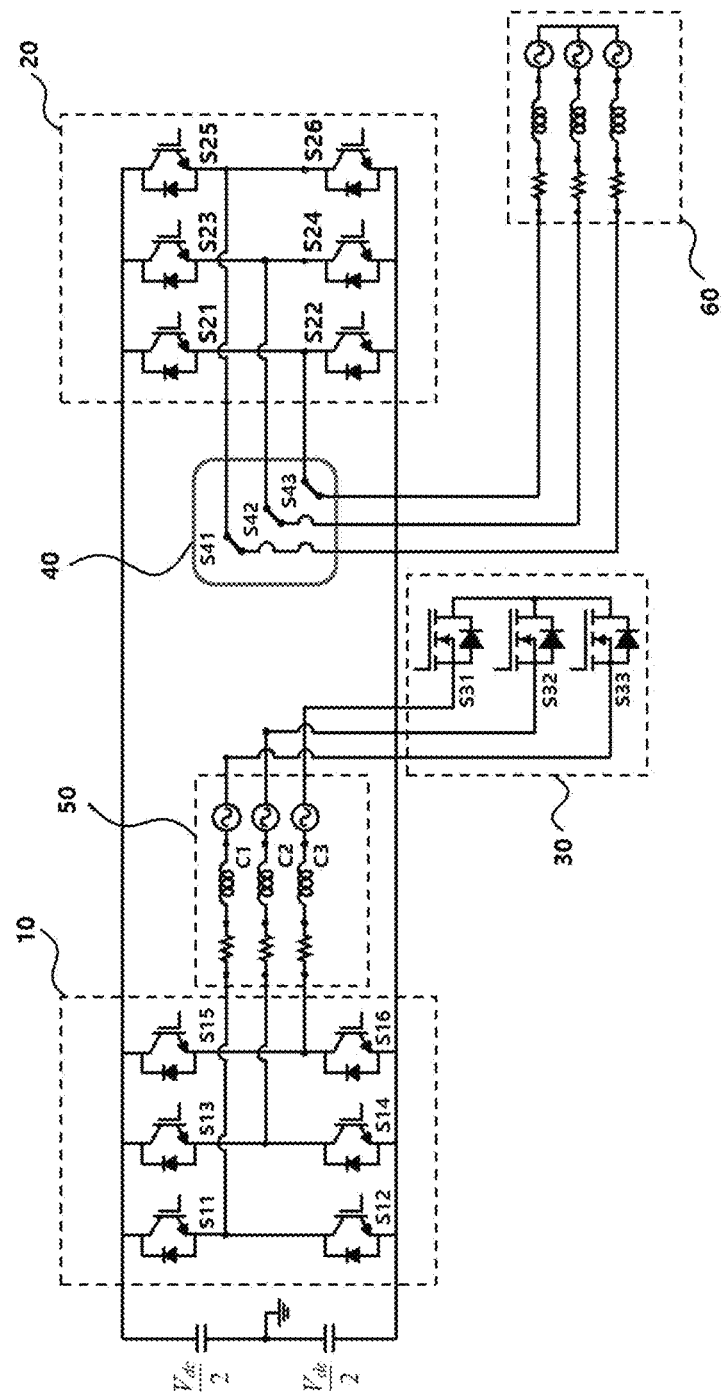
FIG. 4 illustrates an example of a connecting state between components according to yet another driving mode according to an exemplary embodiment of the present disclosure.

FIG. 4 illustrates an example of a connecting state between components according to yet another driving mode according to an exemplary embodiment of the present disclosure.

FIG. 4 shows that the first motor 50 may be driven by the first inverter 10 in the CEW mode and the second motor 60 may be driven by the second inverter 20 respectively when the first changeover switch 30 is turned on and connected to the other end of the windings C1-C3 of the first motor 50, the second changeover switch 40 is controlled to the second state so that each of the windings C4-C6 of the second inverter 20 is connected to the second inverter 20. When the first motor 50 and the second motor 60 respectively correspond to different drive wheels, the driving mode may be referred to as a four-wheel drive mode.

The operation of the controller 70 for selecting each driving mode will be described in the following.

The controller 70 is an element configured to switch the switching elements S11-S16, S21-S26 included in the first inverter 10 and the second inverter 20 through PWM so that the motor 30 may be driven based on the output required for the first motor 50 and the second motor 60. In the various embodiments of the present disclosure, the controller 70 may determine the driving mode according to preset conditions, determining the states of the first changeover switch 30 and the second changeover switch 40 accordingly, and may switch the switching elements of the inverters activated according to the modes through PWM.

For example, the preset condition may be whether the conditions for four-wheel drive requirement and the reverse magnetic flux according to the required torque are satisfied when the motor driving apparatus described above is mounted so that different motors respectively correspond to the main drive wheel and the auxiliary drive wheel, The condition for four-wheel drive requirement may be satisfied when the driver selects a terrain mode or a 4WD/AWD mode, an electronic stability control (ESC) device or a traction control system (TCS) detects a wheel slip or requires a posture control, or the controller in charge of drive power distribution determined the intervention of the auxiliary drive wheels in the all-wheel driving mode, but this is an illustrative example and the satisfaction of the requirement is not limited thereto. When the four-wheel drive requirement is satisfied, the controller 70 may perform a four-wheel drive mode control described above with reference to FIG. 4.

According to the various aspects of the present disclosure, even when generation by an engine cranking or in HEV-series mode is required in a hybrid electric vehicle including the first motor 50 as a driving motor and the second motor 60 as a starter generator, the controller 70 may control the motor driving apparatus as described above with reference to FIG. 4.

On the other hand, when the condition for four-wheel drive requirement is not satisfied, the second motor 60 does not need to be driven so that the controller 70 may drive the first motor 50 in the OEW mode or CEW mode based on the required torque and the corresponding reverse magnetic flux conditions.

A higher-level controller (for example, an integrated vehicle controller or a hybrid controller) that performs the overall control of the powertrain apparatus of an electrified vehicle generally translates the manipulation amount of the accelerator pedal by the driver or acceleration/deceleration request of the ADAS/autonomous driving controller into required torque and transmits the torque command corresponding to the translation result to the controller 70.

The controller 70 may determine the reverse magnetic flux value to correspond to the torque command by referring to the table in which the reverse magnetic flux value of the first motor 50 for each torque is stored and determine the CEW mode to be the driving mode when the determined reverse magnetic flux corresponds to the value that does not generate a reverse magnetic flux entry into the first inverter 10 and the OEW mode as the driving mode otherwise. Here, the reverse magnetic flux value may mean a ratio of the DC-link voltage of the first inverter 10 to the speed of the first motor 50. In other words, the controller 70 may determine the motor driving mode based on the required torque, RPM, and DC voltage applied to the inverter.

In contrast, the controller 70 may determine the motor driving mode by dividing an operating point map defined by torque and revolutions per minute (rpm) based on the principle described above into a CEW region and an OEW region and finding out which region the operating point according to the required torque belongs to in the map.

Figure 5:
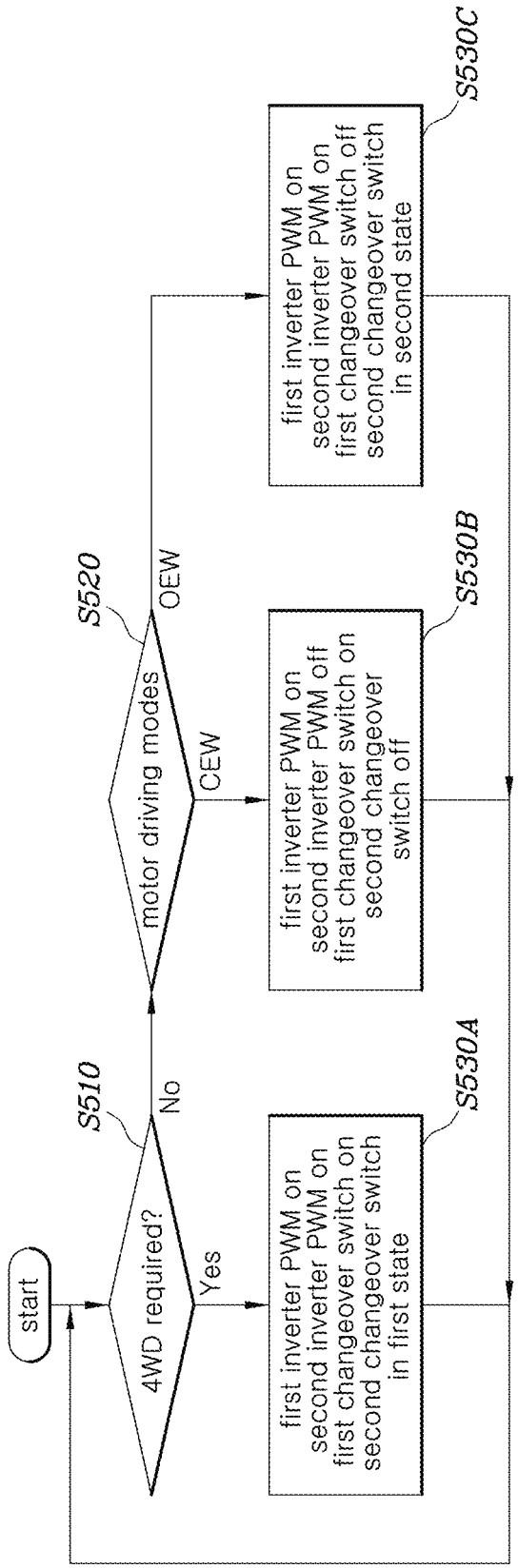
FIG. 5 is a flowchart illustrating an example of a method of controlling a motor driving apparatus according to an exemplary embodiment of the present disclosure.

The method of controlling a motor driving apparatus according to an exemplary embodiment described thus far is summarized in a flowchart as shown in FIG. 5.

FIG. 5 is a flowchart illustrating an example of the method of controlling a motor driving apparatus according to an exemplary embodiment of the present disclosure.

FIG. 5 shows that the controller 100 may control the first inverter 10 by PWM to drive the first motor 50 and the second inverter 20 by PWM to drive the second motor 60 by first turning on the first changeover switch 30 and controlling the second changeover switch 40 to the first state (S530A) when four-wheel drive is required (YES in S510).

If the CEW mode is determined to be the driving mode based on the preset conditions (S520) when the four-wheel drive is not required (NO in S510), the controller 100 turns on the first changeover switch 30, turns off the second changeover switch 40, and control the first inverter 10 by PWM with the second inverter 20 turned off to drive the first motor 50 in the CEW mode.

In contrast, when the controller 100 selects the OEW mode, the controller 100 turns off the first changeover switch 30, controls the second changeover switch 40 to the second state, and controls the first inverter 10 and the second inverter 20 by PWM to drive the first motor 50 in the OEW mode.

FIG. 5 illustrates a case in which the condition of an entry into a motor driving mode in which each of the first motor 50 and the second motor 60 may be driven is a four-wheel drive requirement, but this is an illustrative example. If driving the second motor is required, no condition is binding.

According to the exemplary embodiments of the present disclosure described thus far, a single motor driving system allows the selective driving of one more in either the CEW mode or the OEW mode as well as the driving of another motor without an additional inverter. This allows highly efficient motor driving in the CEW mode in the operating point region where the required output is low and high-powered motor driving in the OEW mode in the operating point region where the required output is high. Furthermore, a four-wheel drive mode may also be implemented or a starter generator may be driven according to the vehicle configuration.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus comprising:
   a first motor including a plurality of first windings respectively corresponding to a plurality of phases;
   a second motor including a plurality of second windings respectively corresponding to a plurality of phases;
   a first inverter including a plurality of first switching elements and connected to a first end of each of the first windings;
   a second inverter including a plurality of second switching elements;
   a first changeover switch including a plurality of third switching elements respectively connected to a second end of each of the first windings at a first end of the first changeover switch and connected to each other at a second end of the first changeover switch;
   a second changeover switch including a plurality of switches selectively connecting the second inverter with the second end of each of the first windings or the second inverter with a first end of each of the second windings; and
   a controller connected to the first inverter, the second inverter, the first changeover switch and the second changeover switch and configured to control states of the plurality of first switching elements, the plurality of second switching elements, the plurality of third switching elements, and the plurality of switches based on a preset condition.

2. The motor driving apparatus of claim 1, wherein the second changeover switch includes operation states of:
   a first state in which the second inverter and the first end of each of the second windings are connected, by controlling the plurality of switches;
   a second state in which the second inverter and the second end of each of the first windings are connected, by controlling the plurality of switches; and
   an OFF state in which the second inverter, the first end of each of the second windings, and the second end of each of the first windings are electrically disconnected from each other, by controlling the plurality of switches.

3. The motor driving apparatus of claim 2,
   wherein the preset condition includes whether driving the second motor is required, and
   wherein the controller is further configured to turn on the first changeover switch and control the second changeover switch to the first state when the driving the second motor is required.

4. The motor driving apparatus of claim 3, wherein, when the driving the second motor is required, the controller is further configured to control the second inverter through pulse width modulation according to whether the driving the second motor is required.

5. The motor driving apparatus of claim 2, wherein the controller is further configured to determine either a closed-end winding mode or an open-end winding mode to be a driving mode of the first motor based on a torque command for the first motor.

6. The motor driving apparatus of claim 5, wherein the controller is further configured to determine the driving mode based on reverse magnetic flux of the first motor corresponding to the torque command.

7. The motor driving apparatus of claim 5, wherein the controller is further configured to determine the driving mode based on a map in which the driving mode is preset for each operating point according to torque and revolutions per minute (RPM).

8. The motor driving apparatus of claim 5, wherein the controller is further configured to turn off the second inverter, turn on the first changeover switch, turn off the second changeover switch, and control the first inverter through pulse width modulation when the closed-end winding mode is determined to be the driving mode.

9. The motor driving apparatus of claim 5, wherein the controller is further configured to turn off the first changeover switch, control the second changeover switch to the second state, and control the first inverter and the second inverter by pulse width modulation (PWM) when the open-end winding mode is determined to be the driving mode.

10. The motor driving apparatus of claim 5, wherein the controller is further configured to determine either the closed-end winding mode or the open-end winding mode to be the driving mode when the driving the second motor is not required.

11. A method of controlling a motor driving apparatus that includes a first motor including a plurality of first windings respectively corresponding to a plurality of phases, a second motor including a plurality of second windings respectively corresponding to a plurality of phases, a first inverter including a plurality of first switching elements and connected to a first end of each of the first windings, and a second inverter including a plurality of second switching elements, the method comprising:
   determining whether driving the second motor is required; and
   turning on, by a controller, a first changeover switch that includes a plurality of third switching elements respectively connected to a second end of each of the first windings at a first end the first changeover switch and connected to each other at a second end the first changeover switch;
   connecting, by the controller, the second inverter with a first end of each of the second windings through a second changeover switch; and
   controlling, by the controller, the second inverter through pulse width modulation (PWM), when the driving the second motor is required.

12. The method of claim 11, wherein the second changeover switch includes a plurality of switches selectively connecting the second inverter with the second end of each of the first windings or the second inverter with a first end of each of the second windings.

13. The method of claim 11, further including determining a driving mode of the first motor to be a closed-end winding mode or an open-end winding mode based on a torque command for the first motor when the driving the second motor is not required.

14. The method of claim 13, further including:
when the driving mode of the first motor is determined to be the closed-end winding mode,
turning on, by the controller, the first changeover switch;
turning off, by the controller, the second changeover switch;
turning off, by the controller, the second inverter; and
controlling, by the controller, the first inverter through pulse width modulation (PWM).

15. The method of claim 13, further including:
when the driving mode of the first motor is determined to be the open-end winding mode,
turning off, by the controller, the first changeover switch;
connecting, by the controller, the second inverter with the second end of each of the first windings through the second changeover switch; and
controlling, by the controller, the first inverter and the second inverter by PWM.

16. The method of claim 13, wherein the controller is further configured to determine the driving mode based on reverse magnetic flux of the first motor corresponding to the torque command.

17. The method of claim 13, wherein the controller is further configured to determine the driving mode based on a map in which the driving mode is preset for each operating point according to torque and revolutions per minute (RPM).

18. The method of claim 11, wherein the driving requirement of the second motor includes a four-wheel drive requirement.

* * * * *